Oct. 26, 1926.
H. J. HOUPERT
PISTON
Filed June 5, 1924
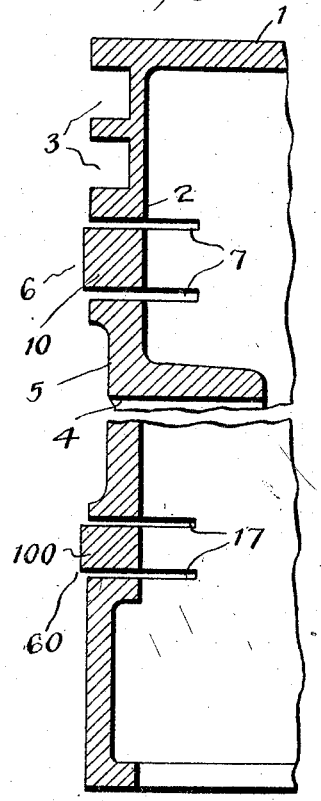
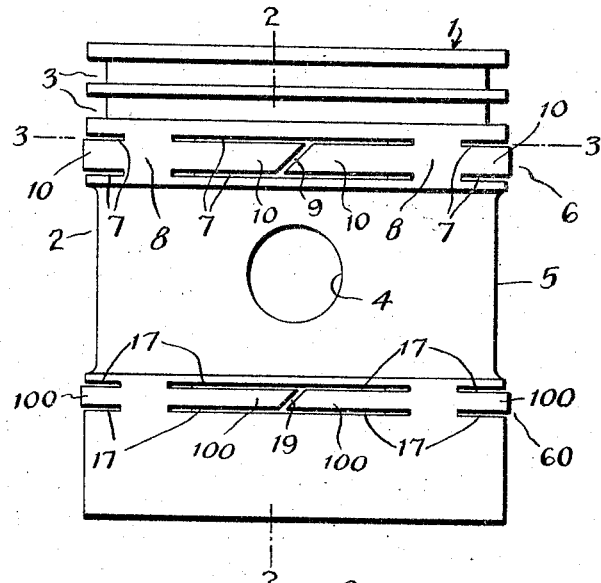
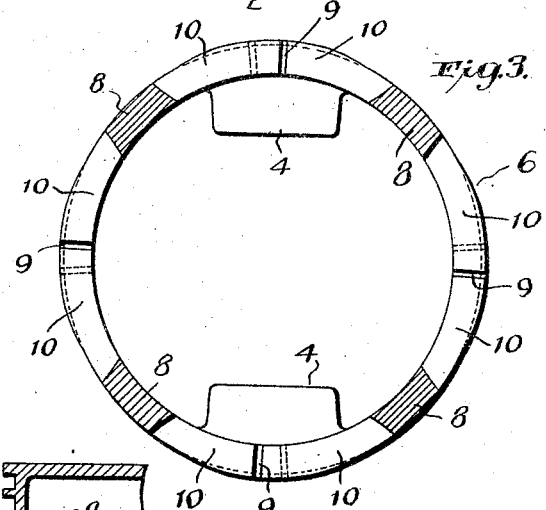
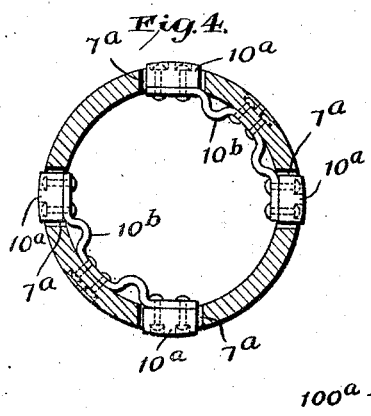
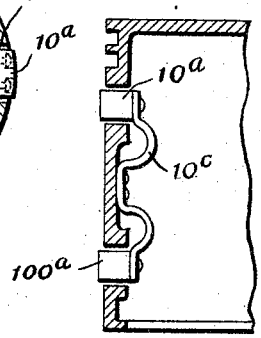

Patented Oct. 26, 1926.

1,604,827

UNITED STATES PATENT OFFICE.

HENRI J. HOUPERT, OF MAMARONECK, NEW YORK.

PISTON.

Application filed June 5, 1924. Serial No. 717,973.

My invention relates to pistons, more particularly those of internal combustion engines, and an object is to improve such pistons in respect to prevention of looseness or side-slap, on the one hand, and avoidance of any possibility of seizing, on the other, as the parts become heated. The object is, further, to provide a piston which will operate satisfactorily in a cylinder which is somewhat out of square, as is likely to be the case when the cylinder has been re-bored without taking the engine down; or which will operate satisfactorily if the wrist-pin hole in the piston has been bored somewhat out of true right-angle to the axis. A further object is to reduce the friction area. In general, the object is to provide a piston which will work in the cylinder better under various conditions, and which will stay in good working order. Still another object is to provide an advantageous oil-scraping device.

These objects are attained by a piston which is full floating in the bore of the cylinder upon springs forming a part of the piston and capable of taking the thrust. In the typical case, strong springs partly cut from the wall of the piston so as to protrude laterally from slots in narrow zones widely spaced above and below the wrist-pin position, afford a plurality of bearings spaced circumferentially about the piston, there being preferably, in each zone, two of the bearings intersected by the vertical axial plane at right angles to the wrist-pin and two intersected by the vertical axial plane of the pin. The specific construction and arrangement may, however, be varied.

In the accompanying drawings forming part hereof:

Fig. 1 is a side elevation of a piston embodying the invention;

Fig. 2 is an enlarged vertical section on the line 2—2 of Fig. 1 through the wall of the piston at one side, an intermediate transverse portion of the piston being broken out;

Fig. 3 is a transverse section on the line 3—3 of Fig. 1;

Fig. 4 is a transverse section on a smaller scale through a modification; and

Fig. 5 is a fragmentary vertical section through still another modification.

The piston of Figs. 1 to 3 has a top 1 and a side wall 2. Piston ring grooves adjacent the head are marked 3. Suitable transverse openings or bosses 4 are shown in the central part of the wall for the wrist-pin. All the central part 5 of the wall is cut back, so that it will always be out of contact with the cylinder wall, and the invention permits of this central part being fashioned in any way that may be desired.

Above the central part and immediately below the piston-ring grooves is a narrow zone 6, where the wall is sufficiently heavy for my purpose. In this region I form pairs of parallel, horizontal slots 7 extending in the circumferential direction for sufficient distances to form the desired springs, the pairs of slots being sufficiently spaced apart circumferentially to leave adequate connecting parts 8. As shown there are four pairs of slots equally spaced around the piston. The slots of each pair are connected centrally by cross-slots 9, preferably diagonal, so that each slotted portion contains a pair of spring tongues 10, the remote bases of which are continuous with the metal of the skirt while their free ends overlap at the cross-slot.

The spring shoe formed by each pair of the spring tongues protrudes laterally from the piston as shown in a somewhat exaggerated manner in the views. The connecting parts 8 and the basal portions of the tongues are cut back sufficiently so that it is only the yielding springs or shoes which will have bearing upon the cylinder wall.

Similar slots 17 and 19, and spring tongues 100, are formed in the zone 60 of the skirt below the central part 5 and as near the bottom of the piston as may be desired.

It will be seen that in each zone there are spring shoes at opposite sides symmetrical to the vertical plane at right angles to the wrist-pin axis, that is to say at right and left of Figs. 1 and 3. These springs take the majority of the side thrust which if an ordinary piston is made with considerable clearance causes side-slap. The present piston does not have to be made with costly precision, but is constructed with very large clearance in its fixed parts, so that there can be no seizing as the result of expansion, notwithstanding which the springs always adjust themselves to the cylinder and give perfect bearing.

The other springs which are provided symmetrical with the vertical plane through the wrist-pin axis contribute to the general purpose, and also take care of conditions tending to put canted stress upon the wrist-pin.

The springs, as previously stated, enable the piston to accommodate itself to a cylinder the bore of which may be slightly inclined, thus avoiding wasteful and destructive friction. In general, the piston is adapted to operate efficiently, with least friction, wear and resistance, under all conditions. The spring shoes also act as oil-scrapers, the excess oil removed passing through the slots.

Test has shown integral springs such as described to be effective for the purposes intended. I do not necessarily limit myself however, to this type of construction, since separate springs and shoes, connected to the piston, may be employed, as illustrated in Figs. 4 and 5. In Fig. 4, four blocks or shoes $10^a$ riveted to the ends of horizontal double springs $10^b$ riveted to the inside of the piston wall, the shoes protruding through slots $7^a$, are shown. In Fig. 5 similar upper and lower shoes $10^a$, $100^a$ are shown riveted to the ends of a vertical double spring $10^c$ riveted at its center to the piston.

The invention is applicable to either cast-iron or aluminum pistons. In connection with the latter it possesses special advantage in that it overcomes the difficulty of the large expansion of aluminum when heated.

The piston with its integral spring slide bearings distributed about its circumference, in two sets above and below the connecting rod connection, cause the piston to be full-floating so as to accommodate itself to relative cocking in any and all directions, at the same time taking up all looseness and allowing for large relative expansion.

What I claim as new is:

A piston the wall of which in each of two narrow zones toward the upper and lower ends of the piston is slotted and formed circumferentially with integral spring tongues, which guide the piston full-floatingly in the bore of a cylinder, there being in each zone spring tongues at the opposite quarters which are intersected by the longitudinal plane at right angles to the wrist-pin axis and likewise spring tongues in the quarters which are intersected by the longitudinal plane through the wrist-pin axis.

HENRI J. HOUPERT.